US009787360B2

(12) United States Patent
Braunshtein et al.

(10) Patent No.: US 9,787,360 B2
(45) Date of Patent: Oct. 10, 2017

(54) ZERO CROSSING INDICATOR DEVICE

(71) Applicant: Sigma Designs Israel S.D.I. Ltd, Tel Aviv (IL)

(72) Inventors: Danny Braunshtein, Kochav Yair (IL); Alex Akselrod, Rishon Lezion (IL)

(73) Assignee: Sigma Designs Israel S.D.I. Ltd., Tel Aviv (IL)

( * ) Notice: Subject to any disclaimer, the term of this patent is extended or adjusted under 35 U.S.C. 154(b) by 682 days.

(21) Appl. No.: 14/164,287

(22) Filed: Jan. 27, 2014

(65) Prior Publication Data
US 2014/0211864 A1    Jul. 31, 2014

Related U.S. Application Data

(60) Provisional application No. 61/830,653, filed on Jun. 4, 2013, provisional application No. 61/757,258, filed on Jan. 28, 2013.

(51) Int. Cl.
*H04B 3/54* (2006.01)

(52) U.S. Cl.
CPC ............ *H04B 3/542* (2013.01); *H04B 3/548* (2013.01); *H04B 2203/542* (2013.01); *H04B 2203/547* (2013.01)

(58) Field of Classification Search
CPC  H05B 33/0815; Y02B 70/126; Y02B 20/346; H02M 3/33507; H02M 3/33523
USPC .............................................................. 307/2
See application file for complete search history.

(56) References Cited

U.S. PATENT DOCUMENTS

| | | | |
|---|---|---|---|
| 8,553,706 B2 | 10/2013 | Riedel et al. | |
| 2007/0025386 A1 | 2/2007 | Riedel et al. | |
| 2009/0256534 A1* | 10/2009 | Videtich | H02M 3/156 323/235 |
| 2011/0109320 A1* | 5/2011 | Curt | H04B 3/546 324/543 |
| 2011/0175712 A1 | 7/2011 | Franco et al. | |

* cited by examiner

*Primary Examiner* — Thienvu Tran
*Assistant Examiner* — David M Stables
(74) *Attorney, Agent, or Firm* — May Patents Ltd. c/o Dorit Shem-Tov

(57) ABSTRACT

An alternating current (AC) zero-crossing indicator apparatus including a current adjusting circuit for adjusting a DC signal current for a duration of time the same as the duration of a received zero-crossing detection signal. The zero-crossing indicator apparatus additionally includes a voltage retainer for maintaining a constant DC voltage applied to a connected load during the adjusting of the DC signal current. Also included is a zero-crossing sensor for generating a zero-crossing indication signal responsive to sensing of the adjusting of the DC signal current.

19 Claims, 14 Drawing Sheets

ZERO CROSSING INDICATOR DEVICE

CROSS-REFERENCE TO RELATED APPLICATIONS

This application claims benefit from U.S. Provisional Patent Application Nos. 61/830,653 filed 4 Jun. 2013 and 61/757,258 filed 28 Jan. 2013, which are hereby incorporated in their entirety by reference.

FIELD OF THE INVENTION

The present invention relates to powerline network devices generally and to a zero crossing indicator device for use with powerline communication devices in particular.

BACKGROUND OF THE INVENTION

Power line communications (PLC) generally include the use of AC (alternating current) power lines as a communication channel. These may include power transmission lines typically used to transport AC voltages over short and long distances, and may also include electrical distribution wiring typically found inside homes and other building structures.

Generally, PLC devices may connect to AC power lines through PLC modems. The modems may modulate a carrier used for carrying data over the AC line sent from the PLC devices, and may demodulate the carrier for extracting data received over the AC line for use by the devices. For convenience hereinafter, the data and the carrier may be referred to as a "PLC signal" or "PLC signals". The modems, which generally require DC voltages for their operation, may include means to allow converting the AC voltage from the AC power lines to DC voltages while allowing modulation and demodulation of the carrier transported over the AC power line.

Modems connected to a same powerline network generally require that transmission of data be synchronized to the AC voltage (or current), hereinafter also AC signal, so that specific transmission parameters may be associated with intervals in the signal to compensate for different noises. Synchronization of data transmission to the AC signal is described in US Patent Publication 2007/0025386 assigned to the common assignees of the present invention and incorporated herein in its entirety by reference. There is disclosed " . . . a powerline network that includes a number of stations including a central coordinator for coordinating transmissions of each of the stations. Each of the stations is configurable to generate one or more tone maps for communicating with each of the other stations in the powerline network. Each tone map includes a unique set of modulation methods for each tone. Each of the stations is further configurable to generate a default tone map for communicating with each of the other stations, where the default tone map is valid for all portions of a powerline cycle. Each of the stations is further configurable to monitor its bandwidth needs and to request additional bandwidth from the central coordinator".

Data transmission synchronization to the AC signal is further disclosed in U.S. Pat. No. 8,553,706 also assigned to the common assignees of the present invention and incorporated herein in its entirety by reference. There is disclosed a method for using powerline phases to synchronize scheduling of data transmission on a powerline network. As further disclosed therein, such powerline phases are defined according to zero cross points (zero crossings) of AC current at a low frequency (typically 50-60-Hz). A power unit for synchronizing data transmission to the zero crossings of the AC signal is described in US Patent Application Publication 2011/0175712 A1 also assigned to the common assignees of the present invention and incorporated herein in its entirety by reference. There is disclosed "an AC/DC converter for converting VAC input to DC, a zero cross unit for modulating the AC/DC converter output to facilitate zero crossing detection based on the output, and a high pass filter (HPF) for filtering data signals, where the data signals are transmitted and received on the same medium from which the VAC input is received".

SUMMARY OF THE PRESENT INVENTION

There is provided, in accordance with an embodiment of the present invention, an alternating current (AC) zero-crossing indicator apparatus including a current adjusting circuit for adjusting a DC signal current for a duration of time at least the same as the duration of a received zero-crossing detection signal. The zero-crossing indicator apparatus may include a voltage retainer for maintaining a substantially constant DC voltage applied to a connected load during the adjusting of the DC signal current. The zero-crossing indicator apparatus may additionally include a zero-crossing sensor for generating a zero-crossing indication signal responsive to sensing of the adjusting of the DC signal current.

According to an embodiment of the present invention, zero-crossing indicator apparatus may additionally include an AC zero-crossing detector for generating the zero-crossing detection signal upon detecting a change of polarity in an AC signal.

According to an embodiment of the present invention, the zero-crossing indicator apparatus may additionally include an AC/DC converter. Additionally, it may include an input noise filter which may include a capacitor.

According to an embodiment of the present invention, the voltage retainer may include a capacitor.

According to an embodiment of the present invention, the zero-crossing detection signal may include a single pulse.

According to an embodiment of the present invention, the connected load may include a powerline communication (PLC) device. Additionally, the PLC device may include a modem.

According to an embodiment of the present invention, the adjusting may include disconnecting a flow of the DC signal current towards the connected load. Alternatively, the adjusting may include reducing a flow of the DC signal current towards the connected load. Reducing the flow may include a negative ramping of the DC signal current flow to the connected load.

There is provided, in accordance with an embodiment of the present invention, a method for indicating an alternating current (AC) zero-crossing including detecting a change in polarity in an AC signal current; generating a zero-crossing detection signal responsive to the detecting; and adjusting a DC signal current for a duration of time of at least a duration of the zero-crossing detection signal. The method may additionally include sensing the adjusting; and generating a zero-crossing indication signal responsive to the sensing.

According to an embodiment of the present invention, the method may additionally include maintaining a constant DC voltage applied to a connected load during the adjusting.

According to an embodiment of the present invention, the method may additionally include converting the AC signal current into the DC signal current.

According to an embodiment of the present invention, the method may additionally include filtering the DC signal.

There is provided, in accordance with an embodiment of the present invention, a direct current (DC) power supply for supplying a DC current to a powerline communication (PLC) device including an AC/DC converter to convert an AC signal current to DC signal current; an AC zero-crossing detector for generating a zero-crossing detection signal upon detecting a change of polarity in the AC signal; and a current adjusting circuit for adjusting the DC signal current for a duration of time at least the same as the duration of a received zero-crossing detection signal.

According to an embodiment of the present invention, the power supply may additionally include an input noise filter.

According to an embodiment of the present invention, the current adjusting circuit may interrupt the DC signal current flow to the PLC device. Alternatively, the current adjusting circuit may reduce the DC signal current flow to the PLC device. Additionally, the reduction may include a negative ramping of the DC signal current flow to the PLC device.

There is provided, in accordance with an embodiment of the present invention, a powerline communication (PLC) device including a voltage retainer for maintaining a substantially constant DC voltage applied during an adjusting of an input DC signal current to the PLC device. The device may additionally include a zero-crossing sensor for generating a zero-crossing indication signal responsive to sensing of the adjusting of the input DC signal current.

According to an embodiment of the present invention, the reducing may include a negative ramping of the DC signal current flow to the connected load.

According to an embodiment of the present invention, the device may include a modem.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
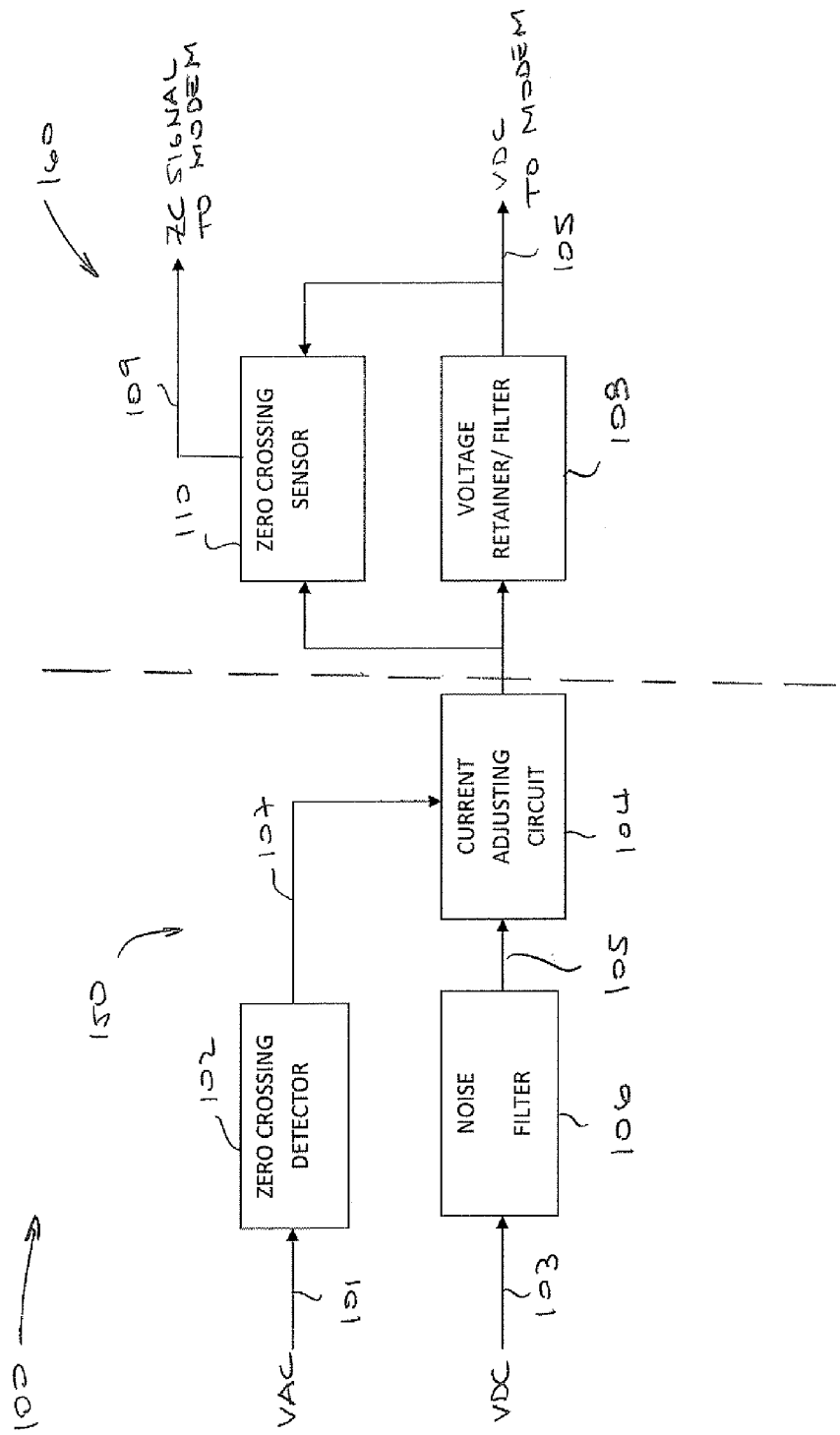
FIG. 1 schematically illustrates a functional block diagram of an exemplary zero-cross indicator apparatus, according to an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The Applicant has realized that OEM manufacturers of PLC modems usually, use DC power supplies, embedded in their device, designed exclusively to operate with their modems. The Applicant has further realized that it would be more advantageous to be able to use any DC power supply, external to any PLC modem, from different OEM manufacturers, instead of using exclusively designed power supplies as is the common practice today. An advantage in allowing any DC power supply to be connected to any PLC modem, the Applicant understands, may reduce the cost of PLC modems and may potentially contribute to growth of PLC communication technology. Furthermore, it may allow for use of a generic DC power which may possibly even be obtained "off-the-shelf".

The Applicant has realized that a zero-crossing indicator apparatus according to the present invention, adapted to detect zero crossings in the AC signal from an AC power line feeding any generic DC power supply, and to generate zero-crossing indications in a DC power line connecting the DC power supply to any PLC modem, may provide a suitable solution to allow using any DC power supply with different PLC modems. The Applicant has further realized that such zero-crossing indications may be generated by using zero-crossing detection signals from a zero-crossing detector to trigger adjustment of the current flowing in the DC power line. Adjustment of the current flow may include reducing and/or disconnecting (interrupting) the DC current flow during the time a zero-crossing is detected. The zero-crossing indications may include short duration signals generated responsive to sensing the adjustment in the DC current flow.

The zero-crossing indicator apparatus of the present invention may be connectable to essentially any DC power supply and to any PLC modem and may include two separate sections, a front section connectable to the DC power supply and a back section connectable to the PLC modem, with both the front and the back sections electrically interconnectable. The front section may be implemented in a separate unit from the back unit, for example, each in its own housing, or may alternatively be implemented in a single housing. In some configurations, the front section may be included as part of the DC power supply in a same housing and/or the back section may be separately included as part of the PLC modem in a same housing.

Zero-Crossing Indicator Apparatus

Reference is now made to FIG. 1 which schematically illustrates a functional block diagram of an exemplary zero-cross indicator apparatus 100, according to an embodiment of the present invention. Apparatus 100 may include a front section 150 which may include a zero crossing detector 102, a current adjusting circuit 104, and a noise filter 106; and a back section 160 which may include a voltage retainer/filter 108, and a zero-crossing sensor 110. Alternatively, noise filter 106 may be excluded from front section 150 and may be included as part of a DC power supply as an output noise filter.

Noise filter 106 may be connected to the output of a generic DC power supply and may receive a DC signal 103 flowing from the DC power supply to a PLC modem. Noise filter 106 may filter noise in the DC signal and may store energy. A noise-filtered DC line 105 from noise filter 106 may be adjusted by current adjusting circuit 104 which may disconnect or reduce the flow of DC signal 105 responsive to zero-crossing detection signals 107 received from zero-crossing detector 102.

Zero-crossing detector 102 may generate zero-crossing detection signals 107 responsive to detection of zero crossings in AC signal 101. Zero-crossing detection signals 107 may be short duration signals, for example, a pulse of a few tens of microseconds. The pulse may be a short positive or negative pulse.

Current adjusting circuit 104 may generally operate in a non-adjustment mode during which DC signal 105 flowing to the PLC modem is not adjusted. Upon detecting a zero-crossing detection signal 107, current adjusting circuit 104 may enter an adjustment mode and may disconnect DC signal 105 so that there is no DC current flow, or reduce the current flow.

Voltage retainer/filter 108 may be operable to maintain the DC voltage in DC signal 103 applied to the PLC modem during the short duration of time when DC signal 105 is adjusted by current adjusting circuit 104. This may assure that there is a continuous DC current supply to the PLC modem components even when the current flow in DC signal 105 is interrupted or reduced. Voltage retainer/filter 108 may additionally provide further noise reduction in DC signal 105.

Zero-crossing sensor 110 may sense adjustment of DC line 105 by sensing a current flow disconnection or reduction in the DC line when current adjusting circuit 104 is activated. Zero-crossing sensor 110 may monitor, continuously or intermittently, to determine whether DC signal 105 is adjusted. Responsive to determination of DC signal 105 being adjusted, zero-crossing sensor 110 may output a zero-crossing indication signal 109 indicative of a zero crossing in AC signal 101. Zero-crossing indication signal 109 may be used by the PLC modem for network synchronization purposes.

Zero-Crossing Indicator Apparatus—Exemplary Implementations

The configurations described herein below in FIGS. 2-3 for several embodiments of zero-crossing indicator apparatuses are not intended to be limiting. The skilled person may realize that the zero-crossing indicator apparatuses described herein may be implemented using other circuit arrangements and may include other components and/or combination of components.

Figure 2:
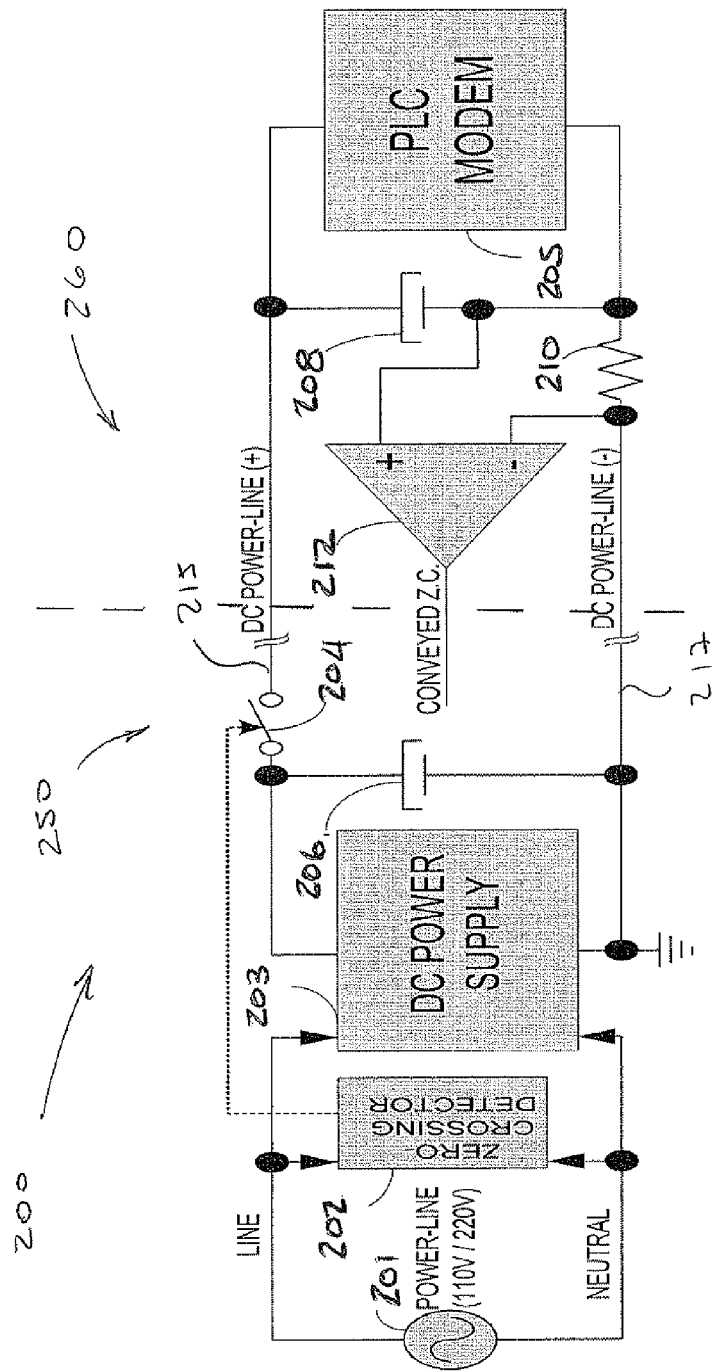
FIG. 2 schematically illustrates another exemplary zero-crossing indicator apparatus, according to an embodiment of the present invention.

Reference is now made to FIG. 2 which schematically illustrates an exemplary zero-crossing indicator apparatus 200, according to an embodiment of the present invention. Apparatus 200 may be functionally similar to apparatus 100 shown in FIG. 1 and may include a front section 250 and a back section 260. Front section 250 and back section 260 may be functionally similar to front section 150 and back section 160 in apparatus 100.

Apparatus 200 is shown connected to a generic DC power supply 203 which converts AC from an AC power line 201 to a DC line, and to a PLC modem 205 which receives the DC voltage from the power supply over a DC power line having a positive (+) line 215 and a negative (−) return line 217. For convenience hereinafter, the two lines of the DC power line may be referred to as "DC(+) power line 215" and "DC(−) power line 217" respectively. Apparatus 200 may include in front section 250 a zero-crossing detector 202, a current switch 204 and a first capacitor 206; and in back section 260, a second capacitor 208, a resistor 210, and voltage comparator 212.

Zero-crossing detector 202 may detect zero crossings in AC power line 201 and may output zero-crossing detection signals to current switch 204 responsive to zero crossing detections. Current switch 204 may be serially connected to DC power supply 203 on DC(+) power line 215 and may act as an adjusting circuit. Current switch 204 in the adjustment mode may adjust the DC current from DC power supply 203 by disconnecting or reducing DC current flow in the DC power line responsive to the zero-crossing detection signals from zero-crossing detector 202. The duration of the time during which DC current flow is disconnected or reduced may be substantially the same as the duration of the zero-crossing detection, and may be a few tens of micro-seconds or greater, for example, 20 μsec, 30 μsec, 40 μsec, 60 μsec, 90 μsec, or greater. In the non-adjustment mode current switch 204 may maintain constant DC current flow through the DC power line from DC power supply 203 to PLC modem 205.

First capacitor 206 may be connected in parallel to the output of DC power supply 203, and may filter noise on the DC line. First capacitor 206 may additionally serve to store energy. First capacitor may be a relatively large capacitor, for example, 100 µf, 200 µf, 300 µf, 500 µl, or greater.

Second capacitor 208 may act as a voltage retainer/filter and may maintain constant DC voltage on the PLC modem 205 when current switch 204 is activated and DC current flow through the DC power line is disconnected or reduced. Second capacitor 208 may be connected in parallel to PLC modem 205. In operation, while current switch 204 is in the non-adjustment mode, second capacitor 208 may be charged to an operating voltage required by PLC modem 205 by the DC line flowing from DC power supply 203 through the DC power line to the modem. In the adjustment mode, although current switch 204 may disconnect or reduce the DC current flow through the DC powerline, capacitor 208 which is charged to the operating voltage of PLC modem 205, may provide the modem with the necessary current required for its operation.

Sense resistor 210 and a voltage comparator 212 may serve as a zero-crossing sensor to sense current adjustments in the current flowing from DC power supply 203 through PLC modem 205, and responsively, to generate a zero-crossing indication. Sense resistor 210 may be serially connected to the PLC modem 205 on DC(−) power line 217. In operation, when current switch 204 is in the non-adjustment mode, constant DC current may flow from PLC modem 205 through sense resistor 210 and may cause a voltage drop across the resistor. Voltage comparator 212 may be connected across sense resistor 210 to sense the voltage drop and may output a signal indicative of current switch 204 being in the non-adjustment mode, for example, a logic "1" output. When current switch 204 is in the adjustment mode, DC current flow from DC power supply 203 may be disconnected or reduced for the duration of time of the zero-crossing detection signal (several tens of µsec) and there is either no DC current flow or reduced current flow through sense resistor 210. Voltage comparator 212 may sense the voltage drop due to the DC current interruption or a reduced voltage drop due to the DC current reduction across sense resistor 210 during the short interval of time and may output a signal indicative of current switch 204 being in the adjustment mode (DC current is adjusted). The output signal, which may be, for example, a logical "0" output, may be the zero-crossing indication signal which may be transferred to PLC modem 205 over the DC power line or through a zero-crossing signaling line connecting to the modem (not shown). Alternatively, for current switch 204 in the non-adjustment mode, sense amplifier 212 may output a logical "0", and in the adjustment mode a logical "1" which may be the zero-crossing indication signal. Upon current switch 204 returning to the non-adjustment mode from the adjustment mode following the zero-crossing, DC current may flow from DC power supply 203 through DC power line to PLC modem 205 until the zero-cross detector detects a next zero-crossing in the AC line.

Figure 3:
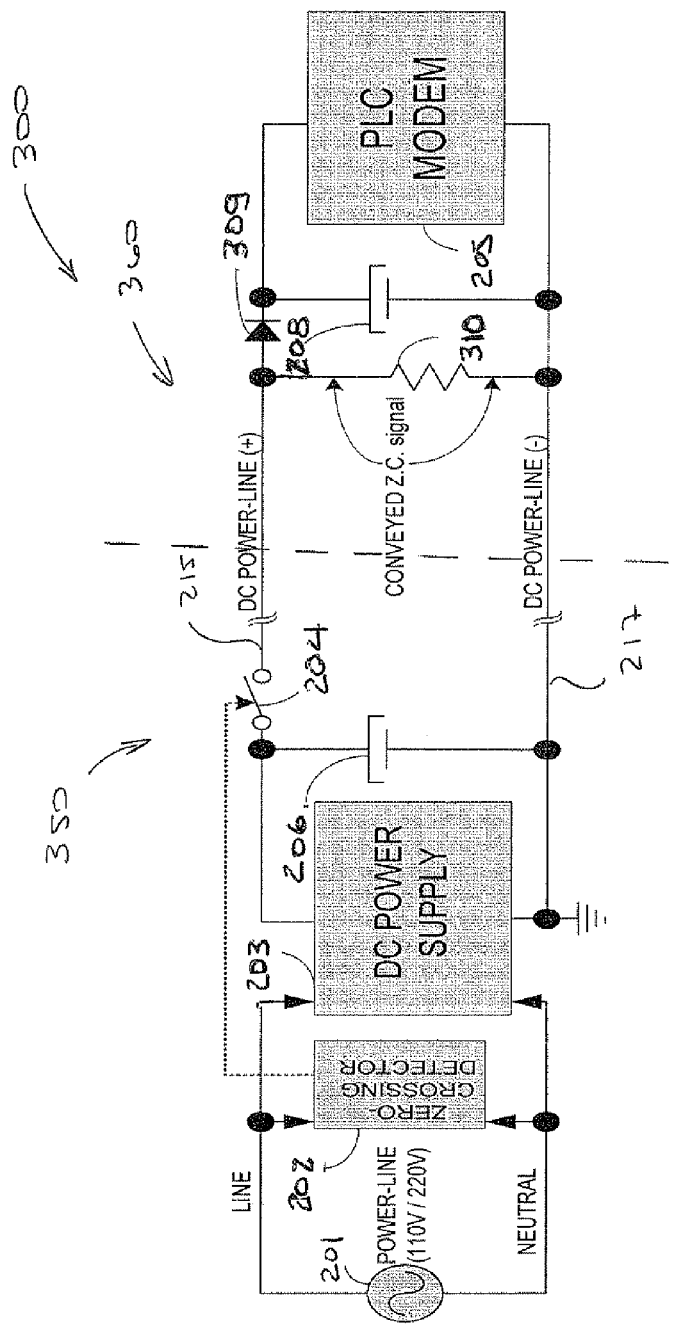
FIG. 3 schematically illustrates another exemplary zero-crossing indicator apparatus, according to an embodiment of the present invention.

Reference is now made to FIG. 3 which schematically illustrates an exemplary zero-crossing indicator apparatus 300, according to an embodiment of the present invention. Apparatus 300 may be functionally similar to apparatus 100 shown in FIG. 1 and may include a front section 350 and a back section 360. Front section 350 and back section 360 may be functionally similar to front section 150 and back section 160 in apparatus 100.

Apparatus 300 is shown connected to generic DC power supply 203 and to PLC modem 205. Apparatus 300 may include in front section 350 zero-crossing detector 202, current switch 204, and first capacitor 206; and in back section 360 second capacitor 208 as in apparatus 200.

Apparatus 300 may additionally include in back section 360 a series combination of a sense resistor 310 and a diode 309. This combination is connected in parallel with second capacitor 208. The DC(+) power line 215 is connected between sense resistor 310 and second capacitor 208.

Apparatus 300 may functionally be similar to apparatus 200 in that current switch 204 may adjust the DC current flow in the DC power line responsive to a zero-crossing detection signal from the zero-crossing detector 202. Capacitor 206 may act as a noise filter and capacitor 208 may act as a voltage retainer/filter. Diode 309 may serve to prevent current flow from capacitor 208 through sense resistor 310 when current switch 204 is in the adjustment mode. In the non-adjustment mode, diode 309 conducts and allows DC current flow through the diode to PLC modem 205 and charging of capacitor 208.

Zero-crossing indication may be performed by monitoring the voltage drop across sense resistor 310. When current switch 204 is in the non-adjustment mode, there is current flow from DC power supply 203 to PLC modem 205 and the voltage drop across sense resistor 310 is substantially equal to the DC voltage output of the power supply. When current switch 204 is in the adjustment mode, there is no DC current flow from DC power supply 203 and there is no voltage drop across resistor 310 (diode 309 is reverse biased with respect to capacitor 208 so there is no current flow from the capacitor through the resistor). Means for sensing the voltage drop across sense resistor 310 may be connected across the sense resistor and may generate the zero-crossing indication signal responsive to sensing the voltage drop across resistor 310. The zero-crossing indication signal may be transferred to PLC modem 205 over the DC power line or through a zero-crossing signaling line connecting to the modem (not shown).

Reference is now made to FIGS. 4A-4E which illustrate exemplary DC waveforms representative of the operation of zero-crossing apparatuses 200 and 300 with current switch 204 interrupting (disconnecting) current flow, according to an embodiment of the present invention.

Figure 4:
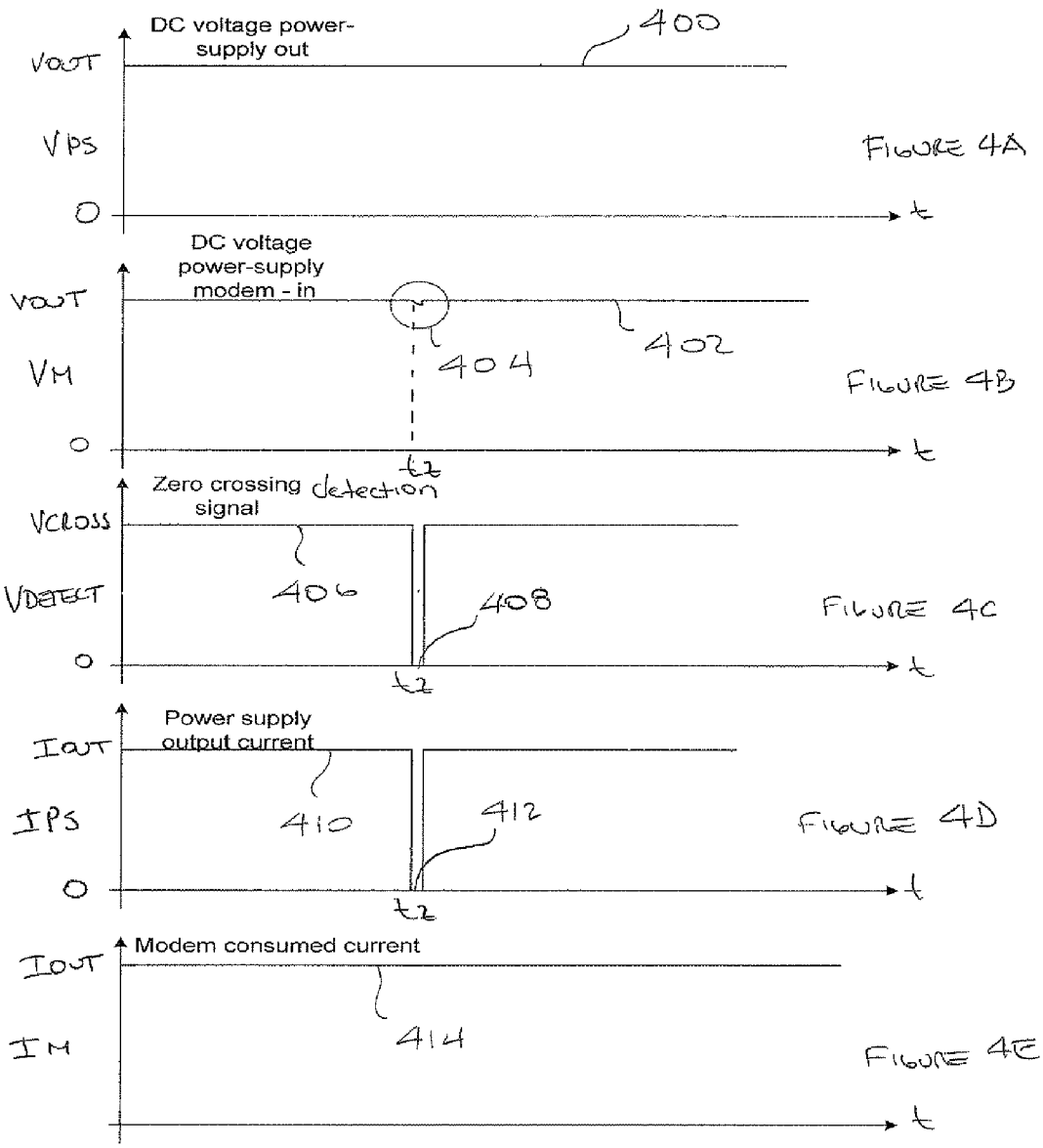
FIGS. 4A-4E illustrate exemplary DC waveforms representative of the operation of zero-crossing apparatus with a current switch interrupting current flow, according to an embodiment of the present invention.

FIG. 4A illustrates an exemplary DC voltage waveform 400 at the output of power supply 203 as a function of time, according to an embodiment of the present invention. The y-axis represents the DC voltage at the output of power supply 203 (VPS) and the x-axis represents time (t). The DC voltage at the output of power supply 203 is shown to be substantially constant over time at VOUT.

FIG. 4B illustrates an exemplary DC voltage waveform 402 at the input to PLC modem 205 as a function of time. The y-axis represents the DC voltage at the input to PLC modem 205 (VM) and the x-axis represents time (t). The DC voltage at the input to PLC modem 205 is shown to be substantially constant over time at VOUT except for a slight pulse 404 which may originate at a zero-crossing time (tz) which may be associated with current switch 204 going into the adjustment mode during the time of a detection of a zero-crossing. In the adjustment mode, although DC current does not flow from DC power supply 203 to PLC modem 205, capacitor 208 is charged to VOUT and provides the required voltage and current for operating PLC modem 205. Slight pulse 404 is indicative of a slight drop in the charged voltage of capacitor 208 for the duration of the adjustment mode, with DC voltage waveform 402 returning to its previous VOUT level when current switch 204 returns to the non-adjustment mode.

FIG. 4C illustrates an exemplary zero-crossing detection signal 406 output from detector 202 to current switch 204 as a function of time. The y-axis may represent the DC voltage of the zero-crossing detection signal (VDETECT) and the x-axis represents time (t). VDETECT is at a value of VCROSS which represents the voltage of the zero-crossing detection signal when the voltage in the AC signal in AC power line 201 is greater than or less than zero (within the tolerance level of the zero-crossing detector). When the voltage is zero, VDETECT drops to "0" as shown at 408. For VDETECT=VCROSS, current switch 204 is in the non-adjustment mode, and for VDETECT=0 the current switch is in the adjustment mode. Additionally or alternatively, the y-axis may represent the DC current of the zero-crossing detection signal (IDETECT, not shown).

FIG. 4D illustrates an exemplary power supply current 410 output from DC power supply 203 (IPS) after current switch 204 as a function of time. The y-axis represents the output current (DC) from power supply 203 (IPS) after current switch 204 and the x-axis represents time (t). IPS is shown to be constant over time at TOUT which is the value of the DC current at VOUT while current switch 204 is in the non-adjusting mode. At time t=tz, current switch 204 goes into the adjustment mode and the current IPS drops to "0" as shown at 412 due to current switch 204 interrupting current IPS flow during the time of the zero-crossing detection. The current IPS returns to constant TOUT following the zero-crossing (until the next zero-crossing).

FIG. 4E illustrates an exemplary direct current input 414 to PLC modem 205 as a function of time. The y-axis represents the DC current at the input to PLC modem 203 (IM) and the x-axis represents time (t). IM is shown to be substantially constant over time at TOUT which is the current when current switch 204 is in the non-adjustment mode and also in the adjustment mode as capacitor 208 supplies the necessary TOUT during the interval starting at t=tz and lasting the duration of the adjustment mode (which may be the duration of the pulse of the zero-crossing detection signal).

Zero-Crossing Indicator Apparatuses—Exemplary Front Sections

Figure 5:
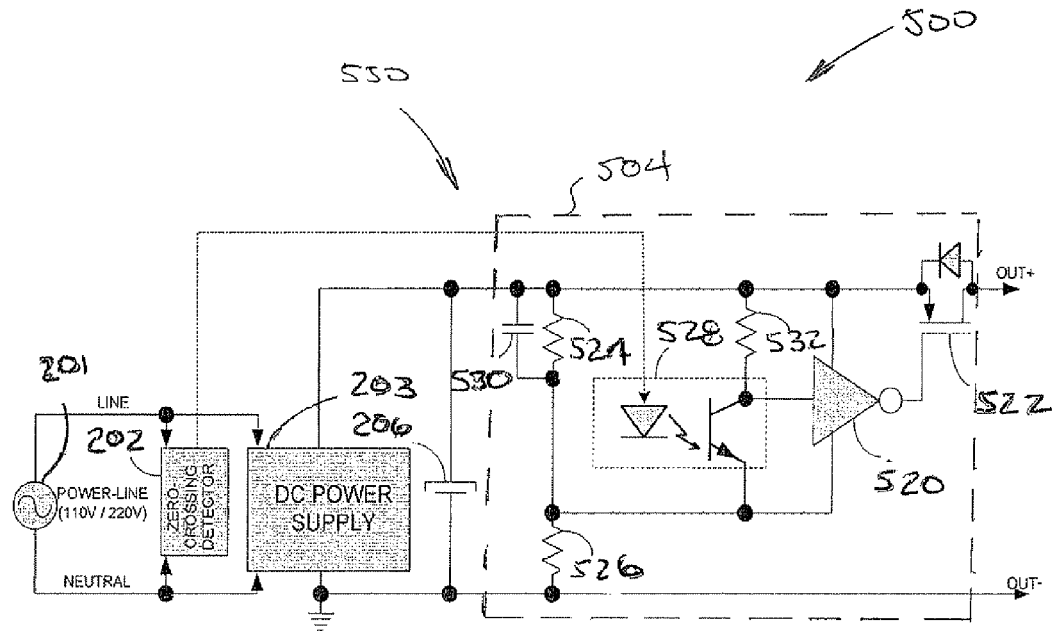
FIG. 5 schematically illustrates an exemplary front section of a zero-crossing indicator apparatus, according to an embodiment of the present invention.
Figure 6:
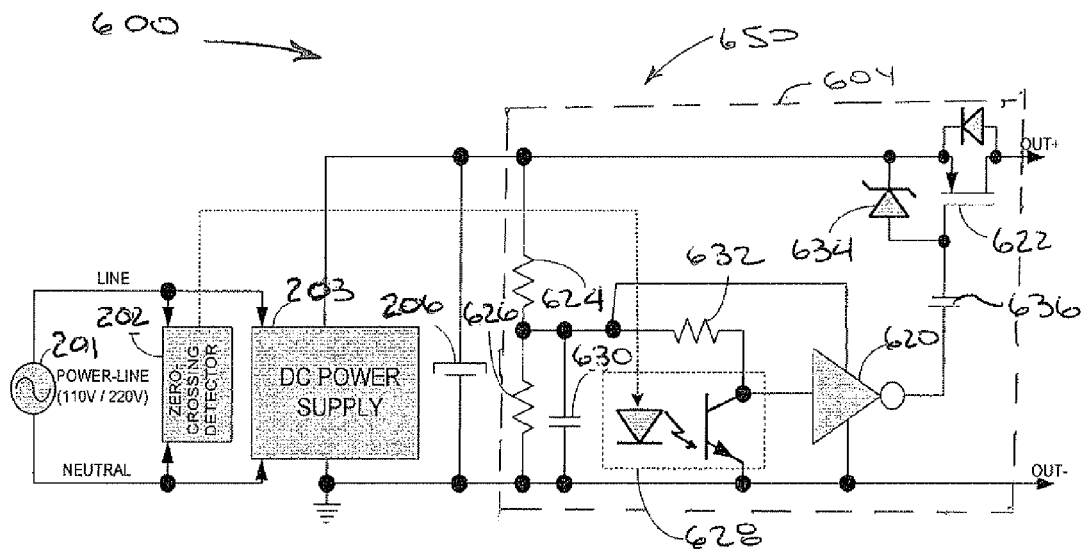
FIG. 6 schematically illustrates another exemplary front section of a zero-crossing indicator apparatus, according to an embodiment of the present invention.
Figure 7:
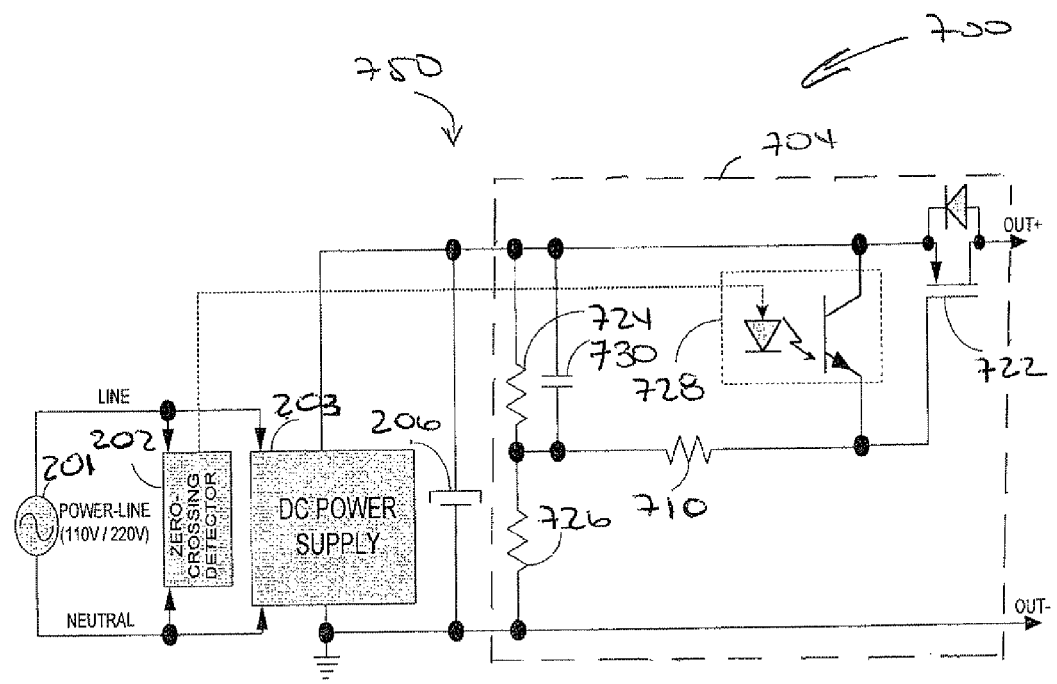
FIG. 7 schematically illustrates another exemplary front section of a zero-crossing indicator apparatus, according to an embodiment of the present invention.

FIGS. 5-7 described below include exemplary front sections of zero-crossing indicator apparatuses, including exemplary circuit arrangements which may be used therein for the current adjustment circuit. The skilled person may realize that the front sections may be implemented using other circuit arrangements and may include other components and/or combination of components.

Typically, inductors may be used in series with the DC power line, on both ends, and on both of its (+) and (−) terminals, (four inductors altogether, not shown in FIGS. 5 through 7). These inductors are generally used to isolate the power-supply low output impedance, and the low input impedance of the capacitor at the modem's supply capacitor from the PLC lines. In addition, they may be required to attenuate power supply noise on the DC power line. Front sections shown in FIGS. 5-7 may be used with inductors which are relatively small.

Reference is now made to FIG. 5 which schematically illustrates an exemplary front section 550 of a zero-crossing indicator apparatus 500, according to an embodiment of the present invention. Apparatus 500 may be functionally similar to apparatus 100. Front section 550 is shown connected to generic DC power supply 203 which converts AC from AC power line 201 to a DC signal, and may include zero-crossing detector 202 and capacitor 206 as in apparatuses 200 and 300. Front section 550 may additionally include a current adjusting circuit 504 which may be used as a current switch, for example, current switch 204 in apparatuses 200 and 300.

Current adjusting circuit 504 may include an inverter 520 which may be used to drive a P– channel MOSFET 522 which may act like a current switch. A voltage divider including resistor 524 and resistor 526 may be used to feed both the inverter 520 and a photo-transistor portion of an opto-coupler 528. When there are no zero-crossing detections (non-adjustment mode), the current consumption of inverter 520 and photo-transistor 528 may consume a relatively low current. This may result in a small voltage drop across a resistor 532 so that a relatively high voltage (logic state "1") may be produced at the input of inverter 520, yielding a low voltage state (logic state "0") at the output of the inverter. The low voltage state at the output of inverter 520 may cause MOSFET 526 to operate in saturation allowing current flow through the MOSFET. When a zero-crossing event is detected (adjustment mode), photo-transistor 528 may conduct and a voltage drop across resistor 532 may yield a low voltage (logic state "0") at inverter 520 input. The low voltage at inverter 520 input may yield a high voltage (logic state "1") at inverter 520 output causing MOSFET 522 to be in a cutoff state preventing current flow through the MOSFET.

During the short time interval of few tens of microseconds during which the zero-crossing is detected, a larger amount of current may be required in order to charge or discharge the gate capacitance of MOSFET 526. A capacitor 530 may be used to provide the momentary larger amount of current.

Reference is now made to FIG. 6 which schematically illustrates an exemplary front section 650 of a zero-crossing indicator apparatus 600, according to an embodiment of the present invention. Apparatus 600 may be functionally similar to apparatus 100. Front section 650 is shown connected to generic DC power supply 203 which converts AC from AC power line 201 to a DC signal, and may include zero-crossing detector 202 and capacitor 206 as in apparatuses 200 and 300. Front section 650 may additionally include a current adjusting circuit 604 which may be used as a current switch, for example, current switch 204 in apparatuses 200 and 300.

Current adjusting circuit 604 may include an inverter 620 which may be used to drive P-channel MOSFET 622 which may act like a current switch. A voltage divider including resistor 624 and resistor 626 may be used to feed both the inverter 620 and a photo-transistor portion of an opto-coupler 628. When there are no zero-crossing detections (non-adjustment mode), the current consumption of inverter 620 and photo-transistor 628 may consume a relatively low current, for example less than 10 μA. When a zero-crossing event is detected (adjustment mode), photo-transistor 628 may conduct and a voltage drop across resistor 632 may yield a low voltage state (logic "0") at the input of inverter 620. This logic "0" may be converted to logic "1" at the output of inverter 620. As the P-channel of MOSFET 622 is connected to the DC(+) power line, in order to control the MOSFET a level shifter may be used to shift voltages at the output of inverter 620 to higher voltage levels at the gate of the MOSFET. The level shifter may be composed of a capacitor 636 and a Zener diode 634.

Reference is now made to FIG. 7 which schematically illustrates an exemplary front section 750 of a zero-crossing indicator apparatus 700, according to an embodiment of the present invention. Apparatus 700 may be functionally similar to apparatus 100. Front section 750 is shown connected to generic DC power supply 203 which converts AC from AC power line 201 to a DC signal, and may include zero-crossing detector 202 and capacitor 206 as in apparatuses 200 and 300. Front section 750 may additionally include a current adjusting circuit 704 which may be used as a current switch, for example, current switch 204 in apparatuses 200 and 300.

Current adjusting circuit 704 may include a P-channel MOSFET 722 which may be driven with a Vgs sufficient to assure low resistance in the non-adjusting mode which may provide a voltage swing which may result in a relatively short switching time. Voltage supply to the transistor portion of opto-coupler 728 may be provided by a voltage divider that includes resistor 724 and resistor 726. When there are no zero-crossing detections (non-adjustment mode), the transistor portion of opto-coupler 728 may consume very low current, which may typically be less than 100 nA. This may result in none, or very small voltage drop across resistor 710, so that the voltage at the gate of MOSFET 722 is substantially negative with respect to the voltage at its source. Consequently, MOSFET 722 may be in an ON mode and DC current may flow through the MOSFET with little resistance. When a zero-crossing is detected (adjustment mode), the transistor part of the opto-coupler 728 may conduct causing a voltage drop across resistor 710. This may cause Vgs in MOSFET 722 to drop to substantially zero, so that the MOSFET may go into cutoff and interrupt conducting DC current. A short time high current may be required to discharge the gate of MOSFET 722. This current may flow through the transistor portion of opto-coupler 728. A capacitor 730 may maintain a substantially constant voltage applied for the voltage swing.

Zero-Crossing Indicator Apparatuses—Exemplary Back Sections

Figure 8:
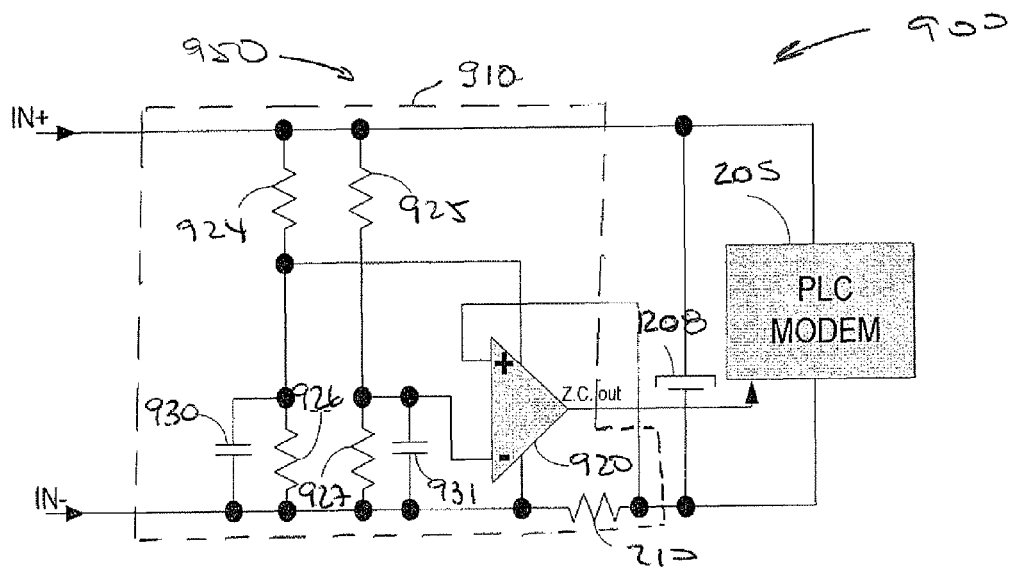
FIG. 8 schematically illustrates an exemplary back section of a zero-crossing indicator apparatus, according to an embodiment of the present invention.
Figure 9:
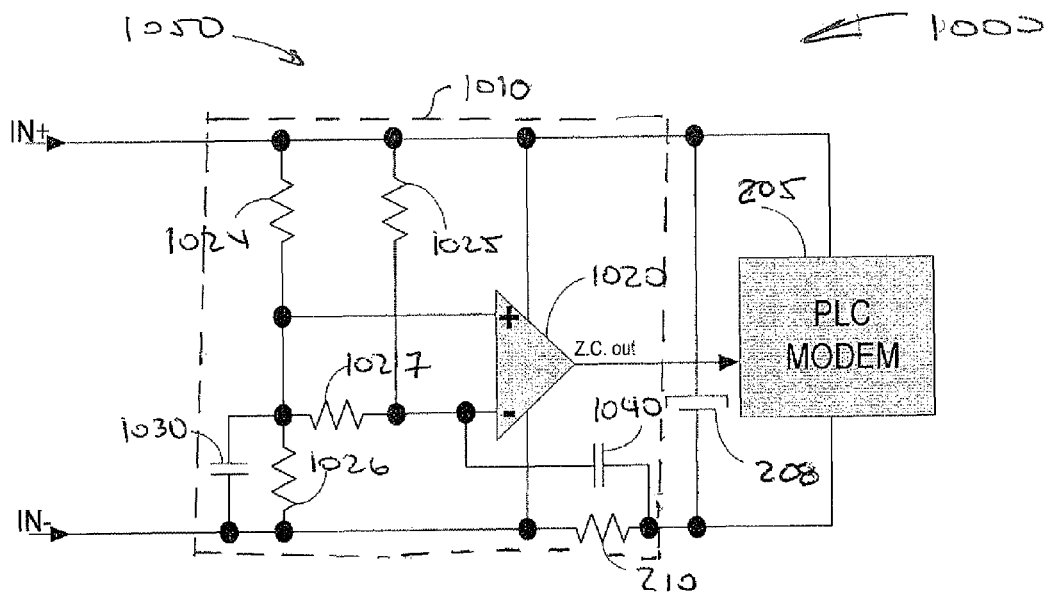
FIG. 9 schematically illustrates another exemplary back section of a zero-crossing indicator apparatus, according to an embodiment of the present invention.
Figure 10:
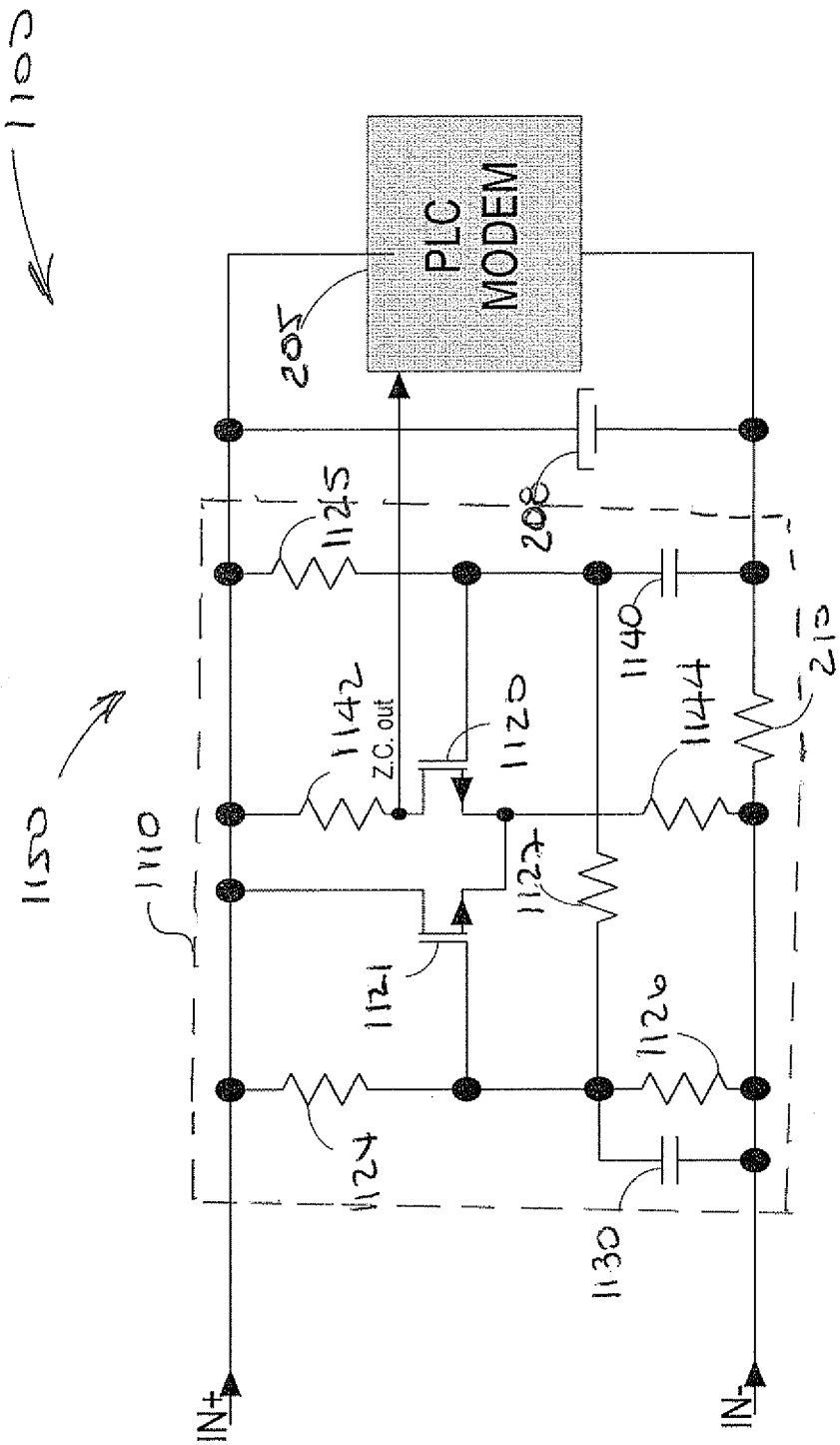
FIG. 10 schematically illustrates another exemplary back section of a zero-crossing indicator apparatus, according to an embodiment of the present invention.

FIGS. 8-10 described below include exemplary back sections of zero-crossing indicator apparatuses, including exemplary circuit arrangements which may be used therein for the zero-crossing sensor. The skilled person may realize that the back sections may be implemented using other circuit arrangements and may include other components and/or combination of components.

Reference is now made to FIG. 8 which schematically illustrates an exemplary back section 950 of a zero-crossing indicator apparatus 900, according to an embodiment of the present invention. Apparatus 900 may be functionally similar to apparatus 100. Back section 950 is shown connected to PLC modem 205 and may include second capacitor 208 and sense resistor 210, as in apparatuses 200 and 300. Back section 950 may additionally include, as part of zero-crossing sensor 910, circuitry described below which may be used to output a zero-crossing indication signal to PLC modem 205. Back section 950 may be used with any of the front sections shown in FIGS. 5-7. Back section 950 may produce a logic "1" output to PLC modem 205 when normal DC current flow is sensed, and a logic "0" when no DC current flow, or reduced current flow, is sensed (zero-crossing indication signal).

Zero-crossing sensor 910 may include a comparator 920 which outputs the logic "1" or logic "0" state to PLC modem 205. A first voltage divider may include a first resistor 924 and a second resistor 926 to produce a voltage for supplying power to comparator 920. A capacitor 930 may serve to maintain power supplied to comparator 920. A second voltage divider includes a third resistor 925 and a fourth resistor 927 which may be used to generate a reference voltage to which the voltage drop across sense resistor 210 may be compared. A capacitor 931 may serve to filter out noise which may originate from the DC power supply.

Reference is now made to FIG. 9 which schematically illustrates an exemplary back section 1050 of a zero-crossing indicator apparatus 1000, according to an embodiment of the present invention. Apparatus 1000 may be functionally similar to apparatus 100. Back section 1050 is shown connected to PLC modem 205 and may include second capacitor 208 and sense resistor 210, as in apparatuses 200 and 300. Back section 1050 may additionally include, as part of a zero-crossing sensor 1010, circuitry which may be used to output a zero-crossing indication signal to PLC modem 205. Back section 1050 may be used with any of the front sections shown in FIGS. 5-7. Back section 1050 may produce a logic "1" output to PLC modem 205 when normal DC current flow is sensed, and a logic "0" when no DC current flow, or reduced current flow, is sensed (zero-crossing indication signal).

Zero-crossing sensor 1010 may include a comparator 1020 which may be supplied from the DC power line and may output the logic "1" or logic "0" state to PLC modem 205. Its positive (non-inverting input) may be biased from a voltage divider which includes a first resistor 1024 and a second resistor 1026. A capacitor 1030 may be used to filter out noise that may reside on the DC power line. A voltage that may be a few tens of mV higher than the voltage applied at the non-inverting input of comparator 1020 may be applied at the inverting input of the comparator. This voltage may be applied by means of another voltage divider which includes a third resistor 1027 and a fourth resistor 1025. A voltage across sense resistor 210 may be AC coupled through capacitor 1040 to the non-inverting input of comparator 1020.

Reference is now made to FIG. 10 which schematically illustrates an exemplary back section 1150 of a zero-crossing indicator apparatus 1100, according to an embodiment of the present invention. Apparatus 1100 may be functionally similar to apparatus 100. Back section 1150 is shown connected to PLC modem 205 and may include second capacitor 208 and sense resistor 210, as in apparatuses 200 and 300. Back section 1150 may additionally include, as part of a zero-crossing sensor 1110, circuitry which may be used to output a zero-crossing indication signal to PLC modem 205. Back section 1150 may be used with any of the front sections shown in FIGS. 5-7. Back section 1050 may produce a logic "0" output to PLC modem 205 when normal DC current flow is sensed, and a logic "1" when no DC current flow, or reduced current flow, is sensed (zero-crossing indication signal).

Zero-crossing sensor 1110 may include discrete MOSFET transistors which may provide similar results to the use of comparators in back sections 950 and 1050 at a possibly reduced cost. A left-side MOSFET 1121 is biased from a voltage divider which includes a first resistor 1124 and a second resistor 1126. A capacitor 1130 may serve to filter out noise that may be present on the DC power line. A right hand side MOSFET 1120 may be biased with a similar voltage, but few tens of mV higher than the bias at the gate of MOSFET 1121. The additional tens of mV may be obtained by a voltage divider composed of a third resistor 1125 and a fourth resistor 1127. The combination of MOSFET 1120, MOSFET 1121, a resistor 1142 and a resistor 1144 may form a differential amplifier whose steady state condition may be logic "0" at the output to PLC modem 205. A voltage across sense resistor 210 which may be indicative of the momentary current flow may be AC coupled to the gate of MOSFET 1120 through a capacitor 1140. Capacitor 1140 may also serve to filter out noise that may be present on the DC power line.

Zero-crossing Indicator Apparatuses with Reduced Current Adjustment

Figure 11:
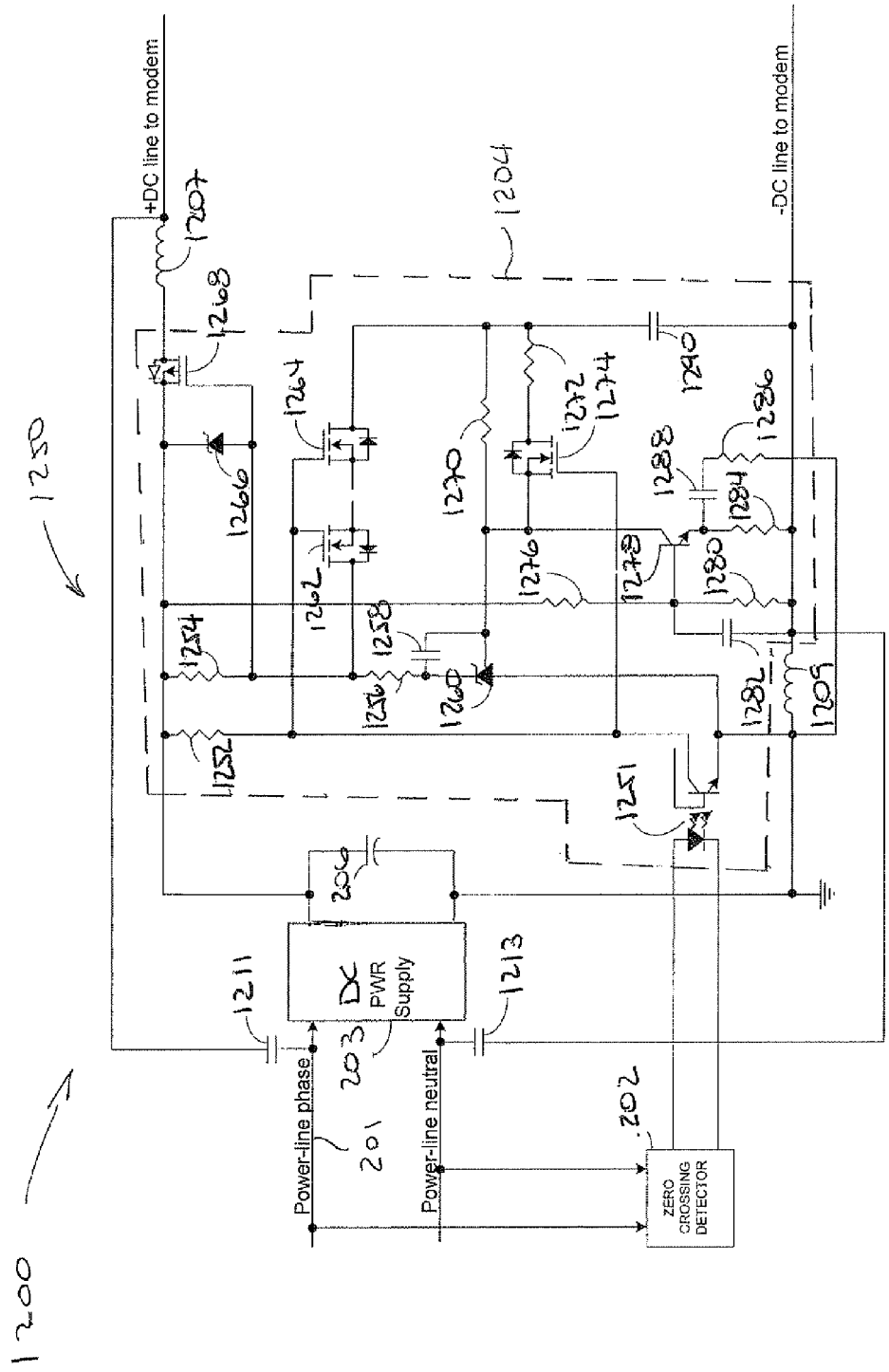
FIG. 11 schematically illustrates an exemplary front section of a zero-crossing indicator apparatus with reduced current adjustment, according to an embodiment of the present invention.
Figure 12:
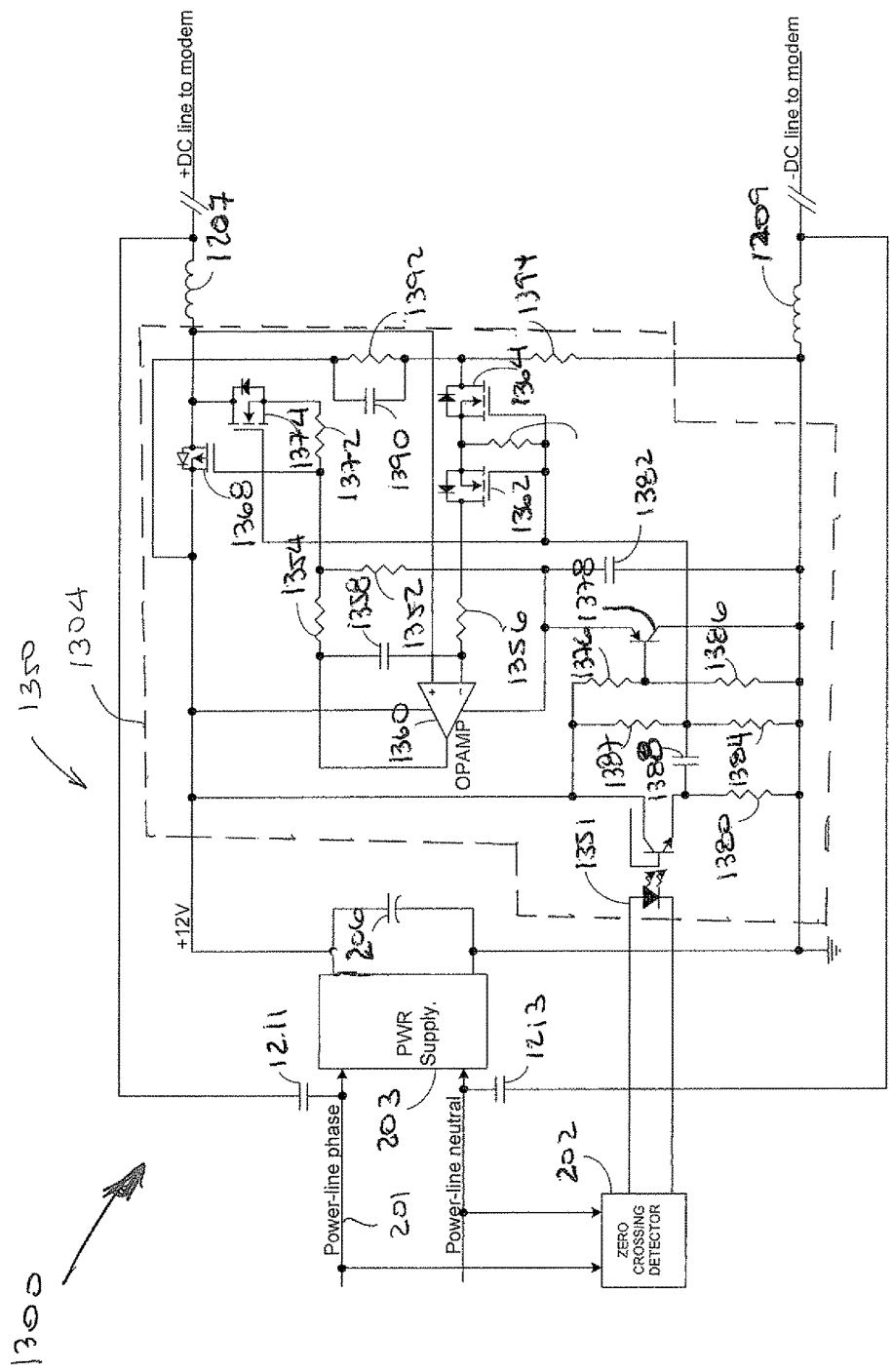
FIG. 12 schematically illustrates another exemplary front section of a zero-crossing indicator apparatus with reduced current adjustment, according to an embodiment of the present invention.
Figure 13:
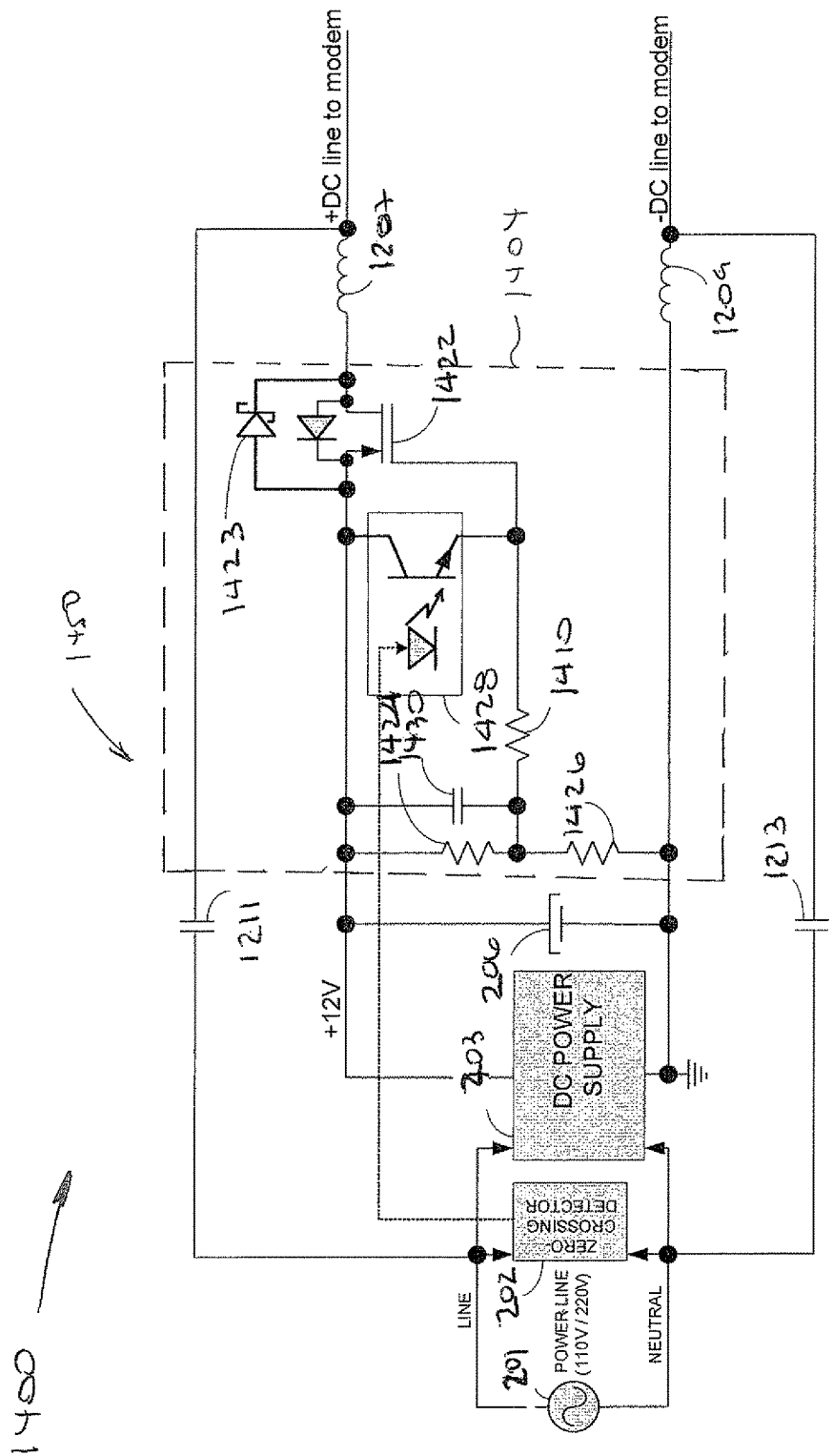
FIG. 13 schematically illustrates another exemplary front section of a zero-crossing indicator apparatus with reduced current adjustment, according to an embodiment of the present invention.

FIGS. 11-13 depict three different approaches, and three different respective exemplary embodiments of the front section of this invention. All three embodiments refer to reduced current adjustment signaling, sharing a common concept. This concept stabilizes the derivatives of the adjusted current, di/dt rather than stabilizing the adjusted current. It produces ramp down followed by ramp up current having stabilized constant derivatives. Reduced current adjustments having moderate constant derivatives ramping slopes are preferable over full cut off adjustments, since they are associated with less spectral noise that may interfere with the PLC signals, and/or may cause incompliance with regulatory standards such as CE, UL and ETSI.

To potentially minimize interference to the PLC signals due to the DC current adjustment, zero-crossing indicator apparatuses may combine a reduced current adjustment scheme with linear current ramping. The linear current ramping up and ramping down and the reduced current adjustment, may reduce harmonics that may interfere with the PLC signals. An example of the current ramping adjustment is provided in FIG. 16, described further on below in context to the zero-crossing indicator apparatuses described below and shown in FIGS. 11 to 15. The reduced current adjustment may be achieved by monitoring induced voltages on series inductors on the DC power line (there are four inductors on the DC power lines). The induced voltage may be calculated by, $V_{induced} = L \, (dI/dt)$.

The configurations described herein below for several embodiments of zero-crossing indicator apparatuses with reduced current adjustment are not intended to be limiting. The skilled person may realize that the zero-crossing indicator apparatus with reduced current adjustment described herein may be implemented using other circuit arrangements and may include other components and/or combination of components.

Exemplary Front Sections with Reduced Current Adjustment

Reference is now made to FIG. 11 which schematically illustrates an exemplary front section 1250 of a zero-crossing indicator apparatus 1200, according to an embodiment of the present invention. Apparatus 1200 may be functionally similar to apparatus 100. Front section 1250 is shown connected to generic DC power supply 203 which converts AC from AC power line 201 to a DC signal, and may include zero-crossing detector 202 and capacitor 206 as in apparatuses 200 and 300. Front section 1250 may additionally include a current adjusting circuit 1204 which may provide reduced current adjustment combined with closed-loop linear current ramping.

Current adjusting circuit 1204 may include a shunt regulator 1260 (or similar component which may be used as an operational amplifier configured to operate as an integrator) which may serve to control the gate of a FET 1268 and which may stabilize desired current ramps in the DC power line. Feedback which may represent the adjusted current slope (derivative) may be obtained by monitoring the voltage across an inductor 1209 on the DC (−) power line. The voltage across inductor 1209 may be AC coupled through a resistor 1286 and a capacitor 1288 and may be converted to emitter current of transistor 1278. The base of transistor 1278 may be biased by resistors 1276 and 1280. A capacitor 1282 may decouple DC power line noise. An opto-coupler 1251 may be operative to turn off (cutoff) FET transistors 1274, 1262 and 1264 responsive to a zero-crossing detection signal from zero crossing detector 202. In between zero-crossing detections these three FET transistors may be saturated (turned on). The pair of FETs 1262 and 1264 may act as a bidirectional analog switch.

In between zero crossings, a closed DC voltage loop which may exclude FET 1268 may be maintained to keep shunt regulator 1260 active (in non-saturated state). This may allow minimizing the time from a zero-crossing detection signal arriving from zero crossing detector 202 to closing the current loop through FET 1268 for stabilizing the current slope. At the absence of zero-crossing signals, the voltage loop may be closed from the junction between resistors 1254 and 1256 through FET switch pair 1262 and 1264 through resistor 1270 in parallel with resistor 1272 and to the negative feedback input of shunt regulator 1260. The closed loop may be designed to stabilize the voltage across resistor 1254 which is the source-gate voltage of FET 1268 so that the FET saturated and DC current my flow through the FET.

Upon receiving a zero-crossing detection signal from zero-crossing detector 202 the opto-transistor of opto-coupler 1251 may conduct and FETs 1262, 1264 and 1274 may be turned off (cutoff). The DC voltage loop through FETs 1262 and 1264 may be cut off and resistor 1272 may be disconnected by FET 1274. Disconnecting resistor 1272 may increase a voltage drop on resistor 1270 and may decrease the voltage at the feedback input of shunt regulator 1260. As a result, the voltage at the gate of FET 1268 may increase (Vgs decreases), and the DC current flow may decrease. Consequently, the current flow may exhibit a negative derivative, which may be translated into a voltage raise on the left hand side of inductor 1209 relative to its right hand side. This may result in less emitter current from transistor 1278 that may be AC coupled through capacitor 1288 and resistor 1286. In turn, this may yield a higher collector voltage at transistor 1278 which may compensate for the voltage drop at on Vgs of FET 1268. The loop is closed by monitoring the voltage on inductor 1209, and the AC coupled feedback through resistor 1286 and capacitor 1288 to the emitter of transistor 1278. The closed loop compensates for the falling voltage step at the feedback input of the shunt regulator 1260, maintaining a constant voltage across inductor 1209, thereby maintaining a constant current derivative through the inductor.

At the end of the zero-crossing detection signal pulse FETs 1262, 1264, and 1274 may be turned on again. FET 1268 may be saturated and the DC voltage at its drain may exhibit a step rise. The DC current through inductors 1207 and 1209 may ramp up until it equals the average current of the load (PLC modem 205 in FIGS. 2 and 3). A capacitor 1258 may provide phase compensation and loop stabilization. A Zener diode 1266 may protect the gate of FET 1268 against over voltage. Capacitors 1211 and 1213 may be safety X1Y1 or X1Y2 capacitors which may couple the PLC signals to the power-line.

Reference is now made to FIG. 12 which schematically illustrates an exemplary front section 1350 of a zero-crossing indicator apparatus 1300, according to an embodiment of the present invention. Apparatus 1300 may be functionally similar to apparatus 100. Front section 1350 is shown connected to generic DC power supply 203 which converts AC from AC power line 201 to a DC signal, and may include zero-crossing detector 202 and capacitor 206 as in apparatuses 200 and 300. Front section 1350 may additionally include a current adjusting circuit 1304 which may provide reduced current adjustment combined with closed-loop linear current ramping. Applying a controlled voltage step at the drain of a FET 1368 having 4 inductors in series (2 in the back section) makes the inductors respond according to the formula $V_{induced}=L*(dI/dt)$ and may allow controlled current slopes.

Current adjusting circuit 1304 may include a voltage divider including resistors 1392 and 1394 which may be used to determine a desired voltage step size (determines the current slope rate). A voltage across resistor 1392 may be the desired voltage step size. An operational amplifier 1360 in conjunction with a FET pair 1362 and 1364 may act as a track and hold integrator with the FET pair serving as a bi-directional analog switch. Two closed loops may be activated when a pulse associated with the zero-crossing detection signal is generated by zero-crossing detector 202. One negative feedback loop is from the drain of FET 1368 through FET 1374 and a voltage divider composed of resistors 1354, 1372, and 1352 to the gate of FET 1368. The other closed loop is from the integrator which may include resistor 1356, capacitor 1358 and op-amp 1360 having its output tied to resistor 1354, which may allow controlling the voltage at the gate of FET 1368. The drain of FET 1368 may be connected to the non-inverting (+) input of op-amp 1360 while the voltage at the junction of resistors 1392 and 1394 may be applied to the inverting (−) input of the op-amp. If the voltage at the drain of FET 1368 is higher than the voltage at the junction of resistors 1392 and 1394, then the voltage at the output of the integrator gradually rises (during the zero-crossing pulse). As a result, the voltage at the gate of FET 1368 may rise too. Consequently Vgs of FET 1368 may decrease and so its conductivity. As a result, the output voltage at the drain of FET 1368 may decline and may stabilize at the desired voltage (voltage at the junction of resistors 1392 and 1394).

In between zero-crossing pulses, FETs 1374, 1362 and 1364 may be cutoff. Since both FETs 1362 and 1364 may be cut off, no current may flow through resistor 1356. Capacitor 1358 may not be discharged and the voltage at the output of op-amp 1360 may be substantially maintained until the next zero-crossing detection pulse. After a number of zero-crossing detection pulses the voltage at the output of op-amp 1360 may converge to a substantially constant level that equals the voltage measured at the junction of resistors 1392 and 1394 referenced to ground. A capacitor 1390 may filter noise across resistor 1392.

Resistors 1376 and 1386 may form a voltage divider buffered by an emitter follower 1378, and may supply power to op-amp 1360. An opto-coupler 1351 in conjunction with a resistor 1380 may convey positive pulses representing zero-crossings to the gates of FETs 1374, 1362 and 1364. A network composed of resistors 1387, 1384, and a capacitor 1388 may act as a level shifter such that FET transistors 1362, 1364, and 1374 may be controlled. At the end of the zero crossing signal originated from the zero crossing detector 202, all the FET transistors 1374, 1362 and 1364 are cut off. As a result, the op-amp 1360 maintains its previous voltage at its output, exiting its track mode and entering its hold mode. Its held output voltage is the same voltage required to maintain the drain of FET 1368 at a voltage equal to the voltage at the junction of resistors 1392 and 1394, when FET 1374 is on. However, at this time, FET 1374 is off, thereby the feedback from the drain to the source of FET 1368 is non-existent. As a result, the Vgs of FET 1368 increases and thereby it is saturated. To conclude, a voltage step from the voltage level of the generic power supply 203, down to the voltage level at the junction of resistors 1392 and 1394 is created to indicate a zero crossing. This voltage step, in conjunction with the 4 inductors 1207, 1209, and two inductors in the back section, creates linear current slopes in accordance with the equation: $V_{Induced}=L(di/dt)$. A capacitor 1382 may serve to attenuate noise found on the DC power line. Capacitors 1211 and 1213 may be safety X1Y1 or X1Y2 capacitors which may couple the PLC signals to the DC power line. Inductors 1207 and 1209 may also isolate the PLC signal from both the low impedance and noise which may be found at the output of power supply 203.

Reference is now made to FIG. 13 which schematically illustrates an exemplary front section 1450 of a zero-crossing indicator apparatus 1400, according to an embodiment of the present invention. Apparatus 1400 may be functionally similar to apparatus 100. Front section 1450 is shown connected to generic DC power supply 203 which converts AC from AC power line 201 to a DC, and may include zero-crossing detector 202 and capacitor 206 as in apparatuses 200 and 300. Front section 1450 may additionally include a current adjusting circuit 1404 which may provide a fixed, reduced current adjustment contrary to front sections 1250 and 1350 where the adjustment may be varied (tunable).

Current adjusting circuit 1404 may include a voltage divider formed by resistors 1424 and 1426 which in conjunction with a capacitor 1430 may provide a voltage to an opto-transistor in an opto-coupler 1428 and to a gate of a FET 1422. When there is no zero-crossing detection signal, the voltage at the gate and Vgs of FET 1422 may be such that the FET may be saturated and may conduct DC current. When a zero crossing pulse is present, the opto-transistor in opto-coupler 1428 may conduct and current may flow through a resistor 1410 so that the voltage at the gate of FET 1422 increases. The increase in the gate voltage of FET 1422 may cause Vgs to be substantially zero and the FET may cut off.

When FET 1422 is in cutoff, DC current flow may continue through a Shottkey diode 1423. A voltage drop across diode 1423 may be substantially higher than the voltage drop across FET 1422 when saturated. This may result in a downward predetermined voltage step, for example 300 mV, when FET 1422 is cut off, and an upward voltage step of substantially the same magnitude when the FET is turned on again. The DC voltage step may be converted into linear current slopes by inductor 1207 in DC(+) power line and inductor 1209 in the DC(−) power line, and by the two inductors in the back section. Capacitors 1211 and 1213 may be safety X1Y1 or X1Y2 capacitors and may couple the PLC signals to the power-line. Inductors 1207 and 1209 may also isolate the PLC signal from both the low impedance and noise which may be found at an output of power supply 203.

Zero-Crossing Indicator Apparatuses—Exemplary Back Sections

Figure 14:
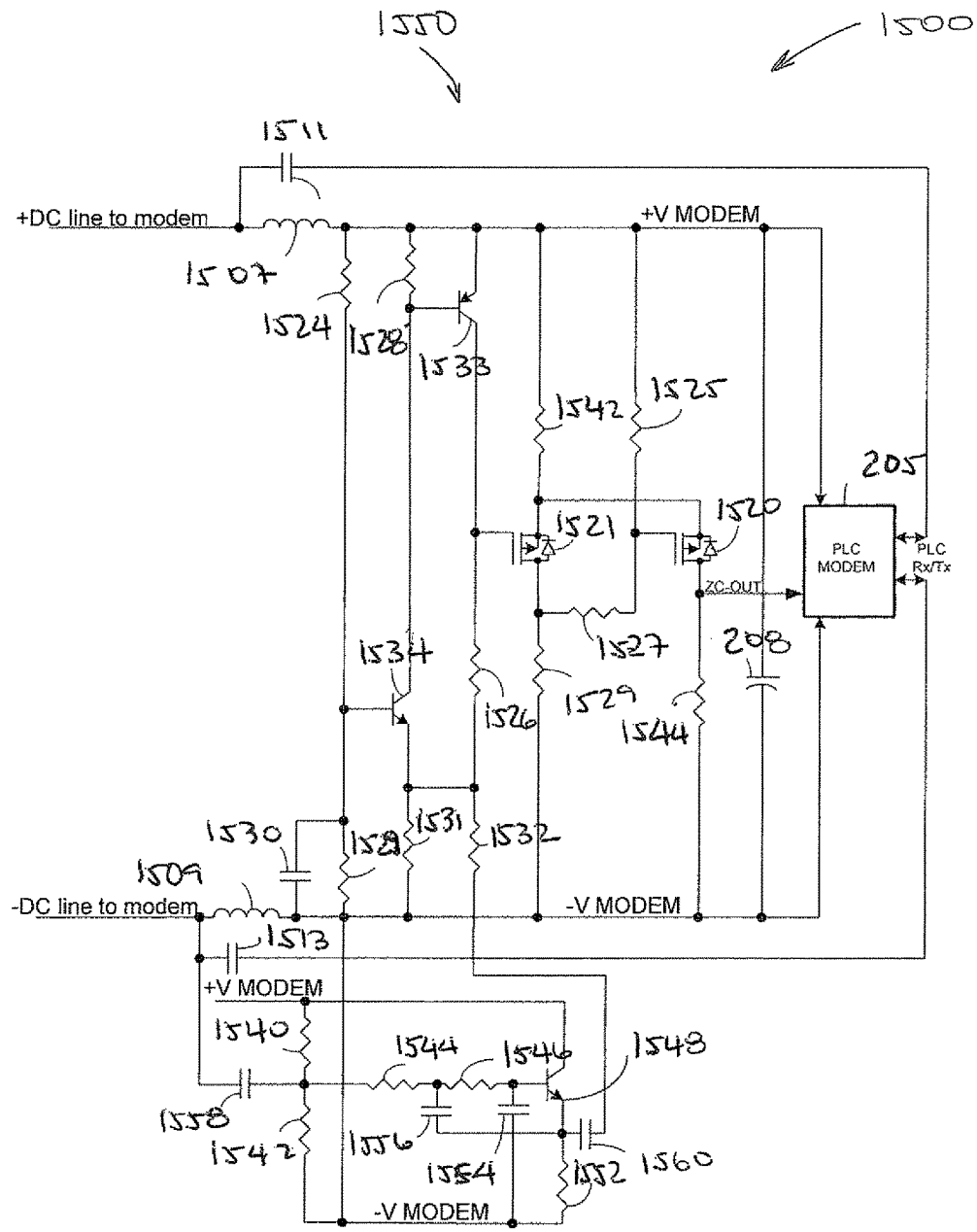
FIG. 14 schematically illustrates an exemplary back section of a zero-crossing indicator apparatus with reduced current adjustment, according to an embodiment of the present invention.
Figure 15:
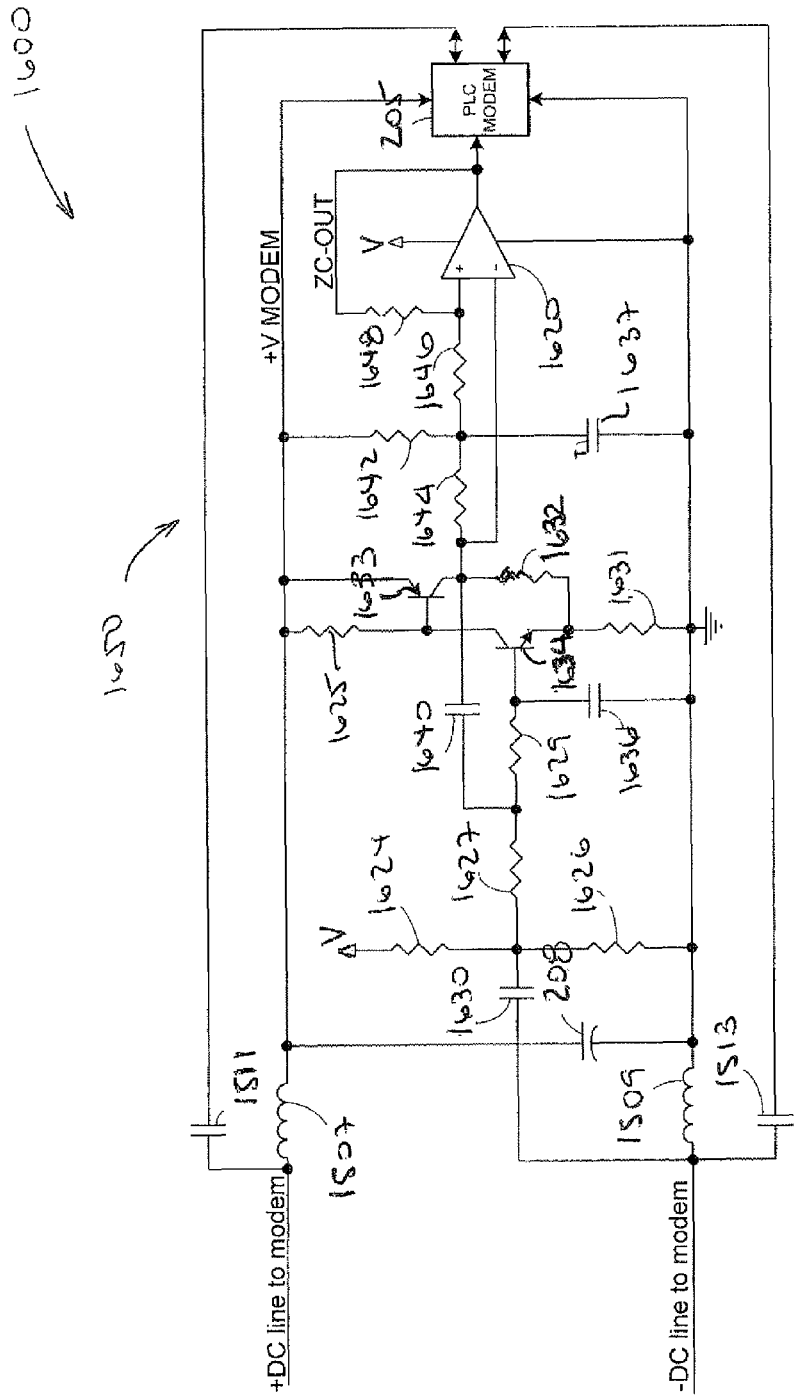
FIG. 15 schematically illustrates an exemplary back section of another zero-crossing indicator apparatus with reduced current adjustment, according to an embodiment of the present invention.
Figure 16:
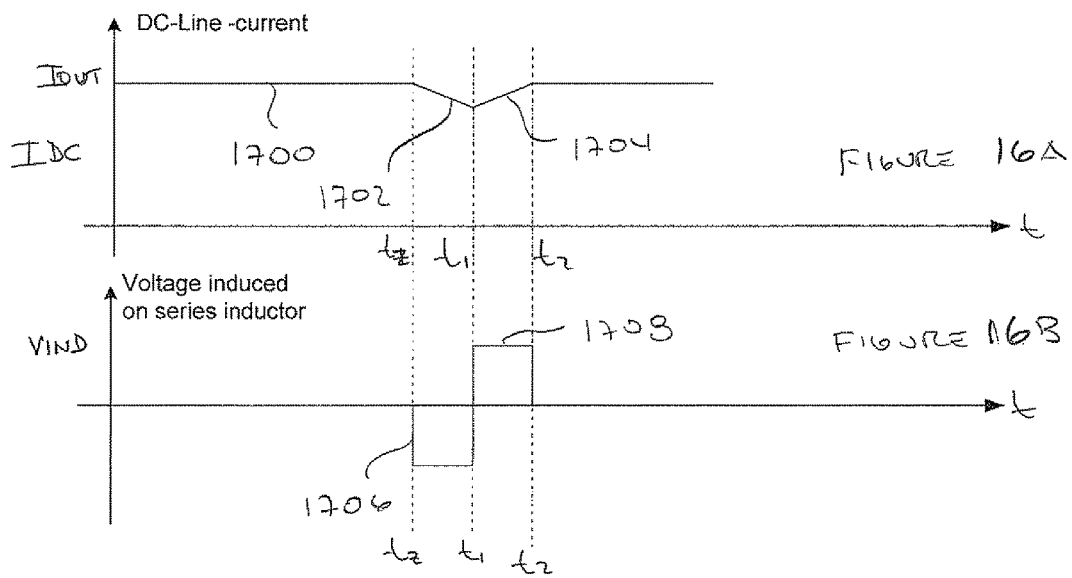
FIGS. 16A and 16B illustrate exemplary waveforms representative of the operation of zero-crossing apparatuses with reduced current adjustment, according to an embodiment of the present invention.

FIGS. 14-15 described below include exemplary back sections of zero-crossing indicator apparatuses with reduced current adjustment, and may be used with front sections 1250, 1350, and 1450, shown in FIGS. 11-13. The skilled person may realize that the back sections may be implemented using other circuit arrangements and may include other components and/or combination of components.

Reference is now made to FIG. 14 which schematically illustrates an exemplary back section 1550 of a zero-crossing indicator apparatus 1500, according to an embodiment of the present invention. Apparatus 1500 may be functionally similar to apparatus 100. Back section 1550 is shown connected to PLC modem 205 and may include second capacitor 208 as in apparatuses 200 and 300. In back section 1550 a voltage across an inductor 1509 may be monitored to obtain an input pulse from the front section. The voltage across inductor 1509 may be proportional to the derivative of the current through it and may be represented by a rectangular shaped voltage pulse as described further on below with reference to FIG. 16.

A low pass filter (LPF) may be used to filter out PLC signals on the DC power line so as to prevent their introducing noise which may interfere with detection of the zero-crossing detection signal (the voltage across the inductor includes the adjusted current and the PLC signal, the latter of which may be associated with "noise" that interferes with the proper operation of the back section). The LPF may be a $2^{nd}$ order LPF and may include resistors 1544, 1546, and 1552; capacitors 1554 and 1556; and transistor 1548. The base of a transistor 1548 may be biased through a voltage divider which may include resistors 1540 and 1542, and may be coupled to the signal across inductor 1509 through a capacitor 1558. The filtered signal may be coupled to a high gain amplifier through a capacitor 1560.

The high gain amplifier may include resistors 1528, 1531, 1532, and 1526; and transistors 1533 and 1534. The amplifier may be biased by a voltage divider which may include resistors 1524 and 1529, and a capacitor 1530 to attenuate noise and PLC signals and prevent them from interfering with the zero-crossing detection. The gain of the amplifier may be determined by the resistance of resistor 1526 divided by the resistance of resistor 1532. The amplified signal may be transferred to a Schmitt trigger circuit whose role may be to convert the analog amplified signal into a digital level signal. The Schmitt trigger may include FET transistors 1520 and 1521 in conjunction with the resistors 1525, 1527, 1529, 1542, and 1544.

Capacitor 208 may be a large capacitor of at least 100 μF and may even be 1000 μF or greater, which may serve to filter small voltage variations which may be associated with the current adjustments and may keep the voltage supply to PLC modem 205 substantially constant. Capacitors 1511 and 1513 may couple the transmitted and received PLC signals from and to PLC modem 205 to the DC power line. In addition to detection of current adjustment associated with the zero crossings, inductors 1509 and 1507 may isolate the PLC signals from both low impedance and noise which may be found at the DC inputs of PLC modem 205.

Reference is now made to FIG. 15 which schematically illustrates an exemplary back section 1650 of a zero-crossing indicator apparatus 1600, according to an embodiment of the present invention. Apparatus 1600 may be functionally similar to apparatus 100. Back section 1650 is shown connected to PLC modem 205 and may include second capacitor 208 as in apparatuses 200 and 300. In back section 1650 a voltage across inductor 1509 may be monitored to obtain an input pulse from the front section. The voltage across inductor 1509 may be proportional to the derivative of the current through it and may be represented by a rectangular shaped voltage pulse as previously mentioned and described further on below with reference to FIG. 16.

The $2^{nd}$ order low pass filter in back section 1650 may include resistors 1627, 1629, 1631, 1632, and 1625; transistors 1633 and 1634; and capacitors 1636 and 1640. The LPF may be an amplifying LPF exhibiting pass band gain of approximately the resistance of resistor 1632 divided by the resistance of resistor 1631. A voltage divider composed of resistors 1624 and 1626 may bias transistors 1633 and 1634, and a capacitor 1630 may be used to AC couple the signal from the junction of the voltage divider with the input of the low pass filter.

The filtered and amplified signal may feed the inverting input of a comparator 1620 directly. Resistors 1646 and 1648 may form a positive feedback network that may add hysteresis to comparator 1620. The left hand side of resistor 1646 may be fed from a network which may be designed to produce a voltage that may exceed the average voltage at the output of the low pass filter by a relatively small voltage which may be, for example, several tens of millivolts. The network that adds several tens of millivolts may include resistors 1642 and 1644, and a capacitor 1637. The network composed of resistors 1646 and 1648, may add hysteresis around the few tens of millivolts introduced by resistors 1642 and 1644. Capacitor 1637 with resistors 1642 and 1644 may act as a low pass filter that passes DC and may allow the signal at the inverting input of comparator 1620 to be compared with a reference voltage which includes the average voltage of the signal itself and the added small voltage (of few tens of millivolts).

Capacitors 1511 and 1513 may couple the transmitted and received PLC signals from and to PLC modem 205 to the DC power line. In addition to detection of current adjustments associated with the zero crossings, inductors 1509 and 1507 may isolate the PLC signals from both low impedance and noise which may be found at the DC inputs of PLC modem 205.

Reference is now made to FIGS. 16A and 16B which illustrate exemplary waveforms representative of the operation of zero-crossing apparatuses with reduced current adjustment 1200-1600, according to an embodiment of the present invention.

FIG. 16A illustrates an exemplary DC current waveform 1700 on the DC power line as a function of time. The DC current on the DC power line is shown to be substantially constant over time while current adjustment circuit does not receive a zero-crossing detection signal. At time t=tz current adjustment circuit receives a zero-crossing detection signal and a negative current ramp 1702 is generated in the DC power line. Negative current ramp 1702 may have a duration until t=t1 which may be the duration of the zero-crossing detection signal (t1-tz). At t=t1, a direction of negative current ramp 1702 may be reversed, sloping back to its initial DC current level at t=t2, as shown by positive current ramp 1704.

FIG. 16B illustrates voltage waveforms representing voltages induced in the DC power line inductors between the times tz and t1, t1 and t2. The voltage waveforms are represented by square pulses 1706 and 1708, which are the derivatives of negative current ramp 1702 and positive current ramp 1704, respectively.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. An alternating current (AC) zero-crossing indicator apparatus comprising:
   a current adjusting circuit for adjusting a DC signal current for a duration of time at least the same as the duration of a received zero-crossing detection signal;
   a voltage retainer for maintaining a substantially constant DC voltage applied to a connected load during the adjusting of the DC signal current; and
   a zero-crossing sensor for generating a zero-crossing indication signal responsive to sensing of the adjusting of the DC signal current.

2. The apparatus according to claim 1, further comprising an AC zero-crossing detector for generating said zero-crossing detection signal upon detecting a change of polarity in an AC signal.

3. The apparatus according to claim 1, further comprising an AC/DC converter coupled to DC power the current adjusting circuit.

4. The apparatus according to claim 3, further comprising an input noise filter coupled between the AC/DC converter and the current adjusting circuit.

5. The apparatus according to claim 4, wherein said input noise filter comprises a capacitor.

6. The apparatus according to claim 1, wherein said voltage retainer comprises a capacitor.

7. The apparatus according to claim 1, wherein said zero-crossing detection signal comprises a single pulse.

8. The apparatus according to claim 1, wherein said connected load comprises a powerline communication (PLC) device.

9. The PLC device according to claim 8, comprising a modem.

10. The apparatus according to claim 1, wherein said adjusting by the current adjusting circuit comprises disconnecting a flow of said DC signal current towards said connected load.

11. The apparatus according to claim 1, wherein said adjusting by the current adjusting circuit comprises reducing a flow of said DC signal current towards said connected load.

12. The apparatus according to claim 11, wherein said reducing comprises a negative ramping of said DC signal current flow to said connected load.

13. A method for indicating an alternating current (AC) zero-crossing comprising:
   detecting a change in polarity in an AC signal current;
   generating a zero-crossing detection signal responsive to said detecting;
   adjusting a DC signal current for a duration of time of at least a duration of said zero-crossing detection signal;
   sensing said adjusting; and
   generating a zero-crossing indication signal responsive to said sensing.

14. The method according to claim 13, further comprising maintaining a substantially constant DC voltage applied to a connected load during said adjusting.

15. The method according to claim 13, further comprising converting the AC signal current into the DC signal current.

16. The method according to claim 13, further comprising filtering the DC signal.

17. The method according to claim 13, wherein said adjusting comprises interrupting a flow of said DC signal current to a load.

18. The method according to claim 13, wherein said adjusting comprises reducing a flow of said DC signal current to the load.

19. The method according to claim 18, wherein said reducing comprises a negative ramping of the DC signal current flow to said load.

* * * * *